US008296008B2

(12) United States Patent
Sampson et al.

(10) Patent No.: US 8,296,008 B2
(45) Date of Patent: Oct. 23, 2012

(54) PROGRAMMABLE FUNCTION KEY ON WIRELESS OBDII INTERFACE

(75) Inventors: Dan Sampson, Kalamazoo, MI (US); Thomas L. Webster, Kalamazoo, MI (US); Richard Mattox, Portage, MI (US)

(73) Assignee: SPX Corporation, Charlotte, NC (US)

( * ) Notice: Subject to any disclaimer, the term of this patent is extended or adjusted under 35 U.S.C. 154(b) by 1170 days.

(21) Appl. No.: 12/048,719

(22) Filed: Mar. 14, 2008

(65) Prior Publication Data

US 2008/0228344 A1 Sep. 18, 2008

Related U.S. Application Data

(60) Provisional application No. 60/906,833, filed on Mar. 14, 2007.

(51) Int. Cl.
*G01M 17/00* (2006.01)
*G06F 19/00* (2011.01)

(52) U.S. Cl. ..................... 701/31.5; 701/32.7; 701/33.2; 701/34.2

(58) Field of Classification Search ..................... 701/33
See application file for complete search history.

(56) References Cited

U.S. PATENT DOCUMENTS

| | | | | |
|---|---|---|---|---|
| 5,671,158 | A * | 9/1997 | Fournier et al. | 701/32 |
| 6,181,992 | B1 * | 1/2001 | Gurne et al. | 701/29 |
| 6,732,032 | B1 * | 5/2004 | Banet et al. | 701/33 |
| 6,925,368 | B2 * | 8/2005 | Funkhouser et al. | 701/33 |
| 6,947,816 | B2 * | 9/2005 | Chen | 701/33 |
| 7,620,484 | B1 * | 11/2009 | Chen | 701/29 |
| 7,665,344 | B2 * | 2/2010 | Brown | 73/23.31 |
| 2003/0130774 | A1 * | 7/2003 | Tripathi et al. | 701/33 |
| 2004/0246150 | A1 * | 12/2004 | Sheehan et al. | 341/22 |
| 2006/0149434 | A1 * | 7/2006 | Bertosa et al. | 701/29 |
| 2006/0161390 | A1 * | 7/2006 | Namaky et al. | 702/183 |
| 2007/0198148 | A1 * | 8/2007 | Namaky | 701/29 |
| 2008/0312786 | A1 * | 12/2008 | Day | 701/33 |

* cited by examiner

*Primary Examiner* — Thomas G. Black
*Assistant Examiner* — Lin B Olsen
(74) *Attorney, Agent, or Firm* — Baker & Hostetler LLP

(57) ABSTRACT

A vehicle diagnostic device is provided that includes a programmable function to control a function on an emission computer workstation. The function key can be programmed to interact and manipulate with the workstation. The vehicle diagnostic device allows a user to wirelessly communicate with the workstation while located in the vehicle.

20 Claims, 4 Drawing Sheets

FIG. 2A

LED Operations - Vehicle

| Power (Red/Green) | Data (Yellow) | Condition |
|---|---|---|
| OFF | OFF | No power to tool |
| GREEN | ON | Good connection to vehicle data link connector |
| GREEN | BLINKING | Normal operation |
| RED | ON | Not connected to vehicle or low vehicle battery voltage |
| RED | BLINKING | Low vehicle battery voltage |
| BLINKING | OFF | S9020-W power on sequence or firmware update in progress |

FIG. 2B

LED Operations - Wireless Network

| Network (Green) | Data (Green) | Condition |
|---|---|---|
| OFF | OFF | No power to tool |
| OFF | ON | Tool powered, wireless connection not established |
| GREEN | BLINKING | Tool powered, wireless connection established, and communicating with vehicle |
| GREEN | OFF | No data activity |

PROGRAMMABLE FUNCTION KEY ON WIRELESS OBDII INTERFACE

CROSS-REFERENCE TO RELATED APPLICATIONS

This application claims priority to provisional U.S. patent application entitled, "Programmable Function Key on Wireless OBDII Interface," filed Mar. 14, 2007, having Ser. No. 60/906,833, the disclosure of which is hereby incorporated by reference in its entirety.

FIELD OF THE INVENTION

The present invention relates generally to a diagnostic device. More particularly, the present invention relates to wireless emissions diagnostic device having a programmable function key.

BACKGROUND OF THE INVENTION

Recently manufactured vehicles are equipped with a special system called On-Board Diagnostic II (OBD II). OBD II monitors all engine and drive train sensors and actuators for shorts, open circuits, lazy sensors and out-of-range values as well as values that do not logically fit with other power train data. Thus, OBD II keeps track of all of the components responsible for emissions and when one of them malfunctions, it signals the vehicle owner by illuminating a Maintenance Indicator Lamp (MIL), such as a check engine indicator. It also stores Diagnostic Trouble Codes (DTCs) designed to help a technician find and repair the emission related problems. OBD II also specifies the means for communicating diagnostic information to equipment used in diagnosing, repairing and testing the vehicle.

An illuminated MIL means that the OBD II system has detected a problem that may cause increased emissions above the Federal Guidelines. A blinking MIL indicates a severe engine misfire that can damage the catalytic converter. The MIL is reserved for emission control and monitored systems and may not be used for any other purpose. The "Check Engine," "Service Engine Soon" or other "engine symbol" message is typically used as an MIL indicator.

The Clean Air Act of 1990 requires inspection and maintenance (I/M) programs to incorporate OBD II testing as part of a vehicle's emissions inspection program. When fully implemented, 1996 and newer model year vehicles registered in a required emission test area must be tested annually. In order to conduct a test, a wired connection has to be made between a computer workstation and the data link connector (DLC) in the vehicle under test. This requires a long OBDII cable from the vehicle to the workstation, which can interfere with the technician as he gets in and out of the vehicle during testing. Additionally, the cable does not allow the technician to manipulate the computer workstation from inside the vehicle and thus requires the technician to unnecessarily return to the computer workstation when he wants to manipulate the workstation.

Accordingly, there is a need for an apparatus and method to send OBDII data wirelessly to the computer workstation and to wireless interact with the computer workstation.

SUMMARY OF THE INVENTION

The foregoing needs are met, to a great extent, by the present invention, wherein in one aspect an apparatus is provided that in some embodiments provides a wireless vehicle diagnostic device that includes a programmable function key in order to control a function on an emission computer workstation.

In accordance with one embodiment of the invention, a vehicle diagnostic device used in emissions testing is provided, which comprises a processor that controls the vehicle diagnostic device used in emissions testing, a memory that contains a software for use by the processor to conduct emissions testing, a communication protocol circuit in communication with the processor and communicates in a communication protocol of a vehicle, a wireless communication module in communication with the processor and allows the vehicle diagnostic device to communicate wirelessly with a remote computing device, a plurality of LEDs on a housing to indicate information to the user as to a state of the vehicle diagnostic device, and a programmable function key that is programmable to run a function on the remote computing device.

In accordance with another embodiment of the invention, a method of controlling a remote workstation with a vehicle diagnostic device used in emissions testing is provided and can include pressing a programmable function button on the vehicle diagnostic device used in emissions testing to start an emission testing software on the workstation, displaying the emission testing software on a display of the workstation, pressing the programmable function button to display a menu of functions of the software on the display of the workstation, cycling through the various functions on the menu by pressing the programmable function button, and pressing the programmable function button to start the emissions testing.

In accordance with yet another embodiment of the invention, a vehicle diagnostic device used in emissions testing is provided, which comprises a means for processing configured to control the vehicle diagnostic device used in emissions testing, a memory means configured to contain a software for use by the means for processing to conduct emissions testing, a means for communicating configured to communicate in a communication protocol of a vehicle and is in communication with the means for processing, a means for wireless communication in communication with the means for processing and allows the vehicle diagnostic device to communicate wirelessly with a remote computing device, a plurality of indicating means on a housing to indicate information to the user as to a state of the vehicle diagnostic device, and a programmable function means that is programmable to run a function on the remote computing device.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2A illustrates the various indications of the power LED and the vehicle LED.

FIG. 2B illustrates the various indications of the wireless network LED and wireless data LED.

DETAILED DESCRIPTION

Figure 1:
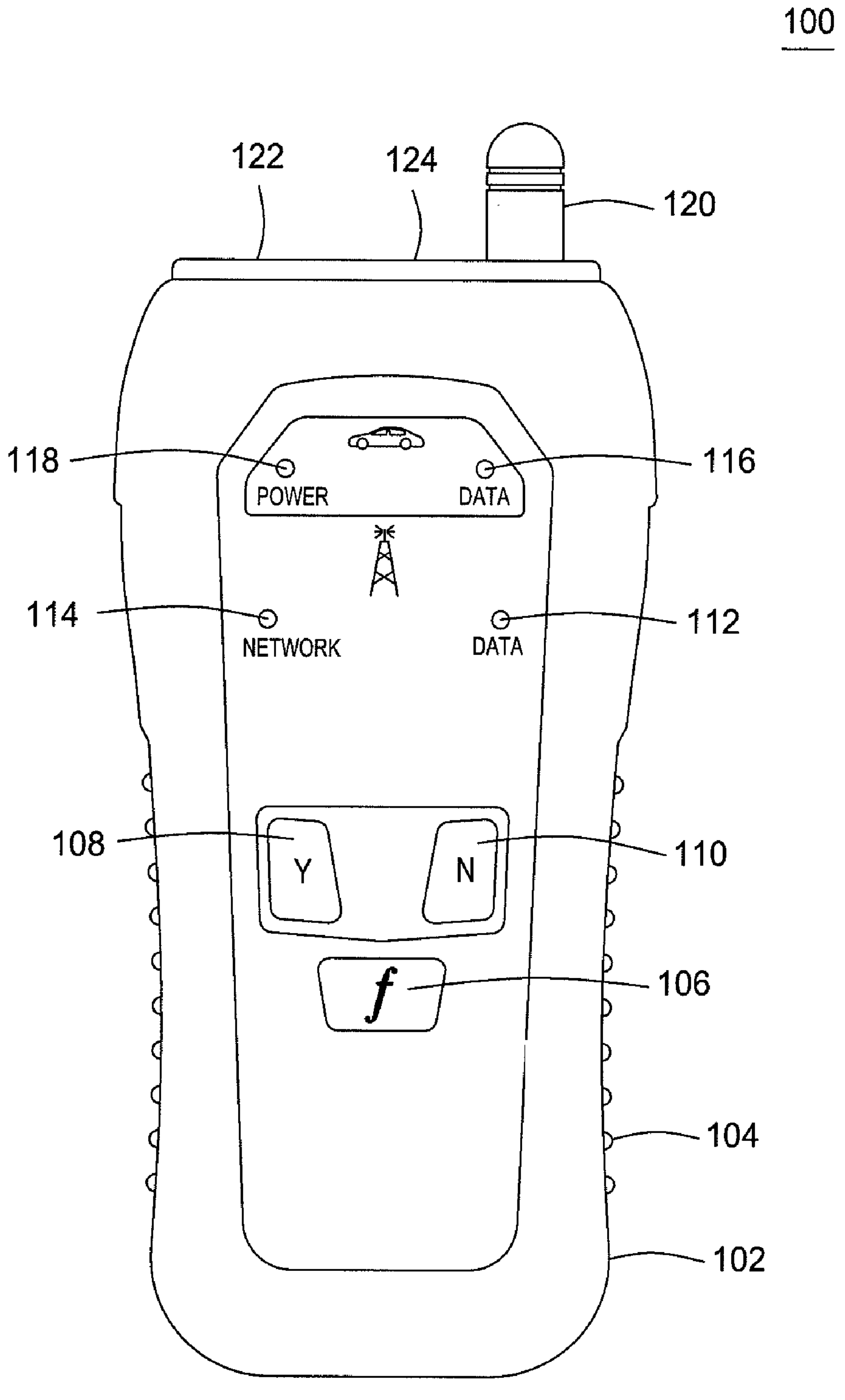
FIG. 1 illustrates a wireless VCI according to an embodiment of the invention.

The invention will now be described with reference to the drawing figures, in which like reference numerals refer to like parts throughout. An embodiment in accordance with the present invention provides a wireless vehicle connector interface (VCI) that can transmit OBD II data to an emissions computer workstation. The wireless VCI can also include a programmable function key in order to interface and manipulate functions on the workstation.

FIG. 1 illustrates a wireless VCI 100 according to an embodiment of the invention. The wireless VCI 100 includes a housing 102 having protrusions 104 on the surface for better gripping of the wireless VCI 100 by the user. The protrusions can be molded into the housing 102 and can be made of a polymer material. Various keys are provided on the surface of the wireless VCI 100 in order to interact with a computer workstation (not shown).

A programmable function key 106 is provided to communicate with the computer workstation. The function key when pressed can perform various functions depending on the programmed function. The function key can be programmed to display a menu screen on the workstation, for example, a menu screen for tests to be conducted during emission testing or a screen showing the conditions of the OBD II readiness monitors of the vehicle under test. The function key can be programmed to print the screen that is active on the workstation or clear DTCs in the vehicle when pressed. Additionally, the function key can be programmed to start recording OBDII data from the vehicle when first pressed and then stop recording when the function key is pressed for the second time. In another embodiment, the function key can be held to record OBD II data and stop recording when the function key is released. The function key can also be programmed to start and stop the emission testing sequence on the workstation when the function key is pressed.

In one embodiment, the initial pressing of the function key will start an OBDII Live Data Application (Application). Once launched, the user can cycle through various screens of the Application by pressing the function key. For example, the function key can bring up the readiness monitor status, DTC (including the DTC's description) screen and other related data such as time since engine start, distance traveled while the ML is activated, minutes run by the engine while MIL, is activated, number of warm-ups since DTCs are cleared, time since DTC cleared, distance driven since DTCs are cleared, and other vehicle data as desired by the user. When the user presses the function key again, the Application is instructed to take the user to emissions related data screens where the $O_2$ sensor data, engine RPM, engine coolant temperature, intake air temperature, fuel system status, barometric pressure, absolute throttle position sensor, intake manifold absolute pressure sensor, air flow rate sensor, vehicle speed, ignition timing, absolute load value, relative throttle positions, commanded EGR, EGR error, commanded evaporative purge and other related data. The data screen can be advanced by pressing the function key until all the data is shown and then to the beginning of the Application screen.

A "Yes" button 108 and a "No" button 110 are provided in order to answer queries from the Application software. The queries can be part of the emissions test being performed, such as "are you sure you want to clear all active OBDII trouble codes?" The user can then press the "Yes" in order for the VCI to clear the DTCs from the vehicle and the user will be notified if the DTCs have been cleared or press the "No" button to return to the screen that displays the readiness monitors and the DTCs. By having the "Yes" or "No" button on the wireless VCI, the user can communicate the answer to the queries from inside the vehicle, and thus minimize the amount of times he needs to return to the workstation. In other embodiments, the "Yes" and "No" buttons can also be programmable similar to the function key 106. Additionally, the "Yes" and "No" buttons can be used scroll through a screen on the workstation. In some embodiments, the "Yes" can scroll the screen up and the "No" can scroll the screen down or vice versa.

The wireless VCI also includes on its surface various LED indicators to indicate certain status of the wireless VCI when viewed alone or in combination with each other. The following are but examples of what the LED can indicate and are not meant to be limiting. A wireless data LED 112 is provided to indicate that the wireless VCI is off, on, is communicating with the vehicle or with the workstation and/or no data activity. A wireless network LED 114 is provided to indicate that the wireless VCI is off, on, a wireless connection not established, and/or a wireless connection established with the workstation.

A vehicle data LED 116 is provided to indicate that the wireless VCI is off, has good connection with the DLC, is in normal operations, is not connected to the vehicle, low vehicle battery voltage, power on sequence and/or updating firmware. A power LED 118 is provided to indicate no power is being received by the VCI, normal operation, is not connected to the vehicle, low vehicle battery voltage, power on sequence and/or updating firmware.

The LEDs described herein can indicate the state of the wireless VCI alone or in combination with each other and are not limited to these examples. Examples of what the LEDs indicate are shown in the FIGS. 2 and 2A below.

FIG. 2A illustrates the various indications of the power LED 118 (Red/Green) and the vehicle data LED 116 (Yellow). When power LED 118 and data LED 116 indicate "Off," this means the tool has no power. When the power LED 118 is "Green" and the data LED 116 is "On," this means there is good connection with the vehicle DLC. When the power LED 118 is "Green" and the data LED 116 is "blinking," this means the tool is in normal operations. When the power LED is "Red" and the data LED 116 is "On," this means the tool is not connected to the vehicle or low vehicle battery voltage. In one embodiment, the power can be supplied via the vehicle's battery through the DLC. When the power LED is "Red" and the data LED is "blinking," this means low vehicle battery voltage. When power LED is "blinking" and the data is "Off," this means that power on sequence or firmware update is in progress.

FIG. 2B illustrates the various indications of the wireless network LED 114 (Green) and wireless data LED 112 (Green). The LEDs can indicate various operation status of the wireless VCI 100 depending on if they are on, off, or blinking. The LEDs also assist the user to communicate with customer service as to what is not functioning properly on the VCI. In one embodiment, when the network LED 114 and the data LED 112 are both "Off," this means the tool has no power. When the network LED is "Off" and the data LED is "On," this means the tool is powered but no wireless connection. When the network LED is "Green" and the data LED is "blinking," this means the tool is powered and the tool is connected and is communicating with the vehicle. When the network LED is "Green" and the data LED is "Off," this means no data activity.

Returning to FIG. 1, the wireless VCI includes an external antenna 120. In other embodiments, the antenna can be internal. The wireless VCI can communicate via any wireless communication means such as Wi-Fi (802.11), Radio Frequency (RF), Bluetooth, Infrared, WLAN, LAN, cellular, satellite, microwave, ultra-wideband, or other wireless communication means. Because the VCI is wireless, the user can run the emission test in the vehicle and can minimize the exiting and entry of the vehicle during testing.

A computer connection 122 is provided so that the user can connect to the workstation via a wired connection when desired. The computer connection 122 can be a USB, serial (RS232, for example), parallel or any other wired connection. The computer connection allows the VCI to communicate with the workstation to transfer data or to receive a firmware update. An OBDII connector 124 is provided so that a cable (not show) can be connected at a first end to the OBDII connector 124 and at a second end to the DLC. The cable allows the vehicle's OBDII system to communicate with the wireless VCI. The wireless VCI can communicate in various communication protocols, such as ISO 9141-2, J1850 PWM, J1850 VPW, ISO 14230-4, ISO 15765-4 (CAN) and other communication protocols. The cable can also provide power to the wireless VCI from the vehicle's battery via a pin in the cable. Alternatively, the VCI can have its own internal power (battery) or powered by an external source such as A/C or D/C or by docking to a docking station.

Figure 3:
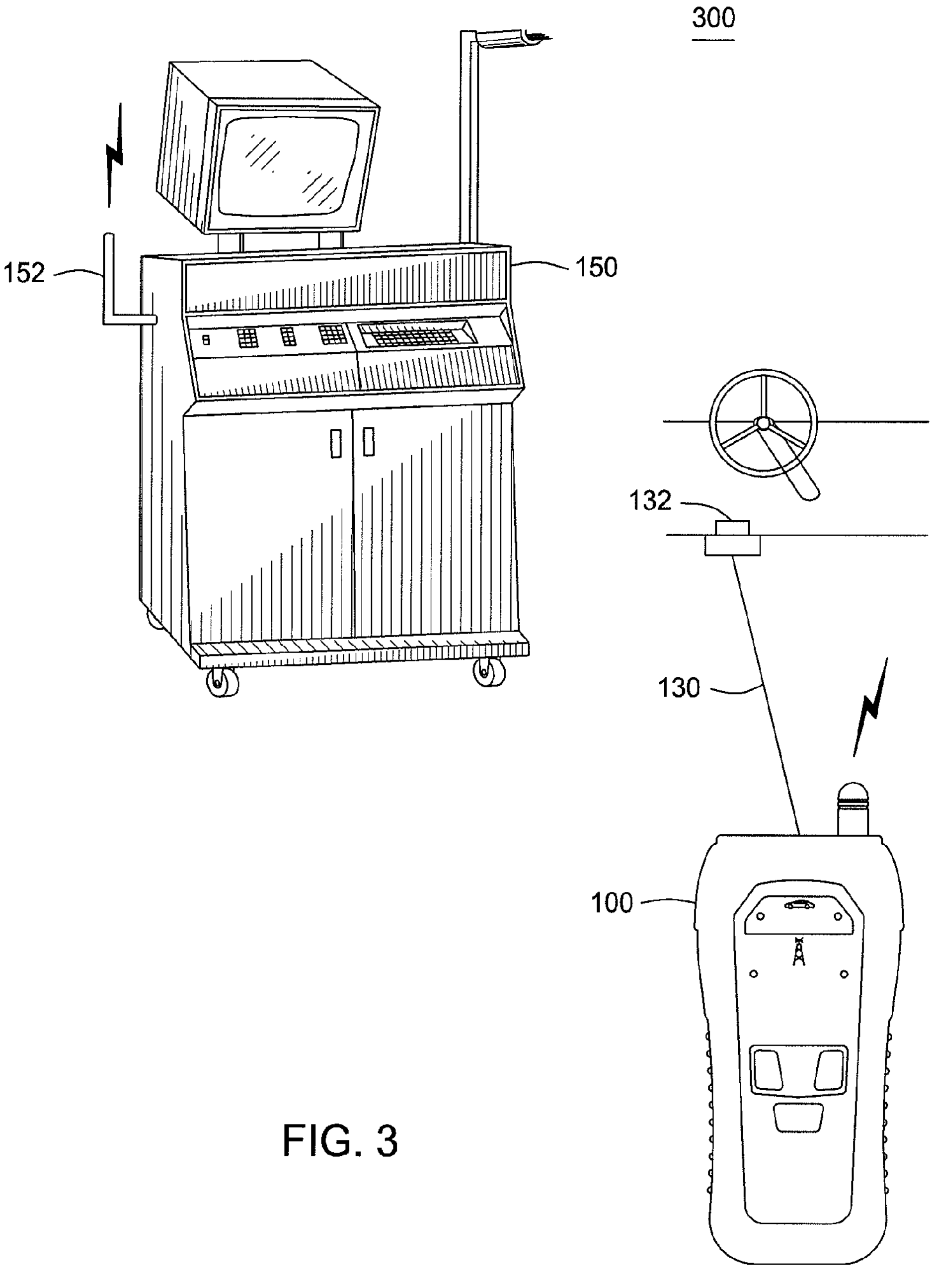
FIG. 3 illustrates the wireless VCI connected to the DLC for a vehicle and communicating with the workstation.

FIG. 3 illustrates the wireless VCI 100 connected to the DLC 132 of a vehicle and communicating with the workstation 150. The wireless VCI 100 can be connected with the DLC of the vehicle via the OBDII cable 130. The wireless VCI 100 can communicate with one or more workstation as desired. The workstation includes the software and hardware required to conduct the emission test. Additionally the workstation includes an antenna 152 to wireless communicate with the wireless VCI.

Figure 4:
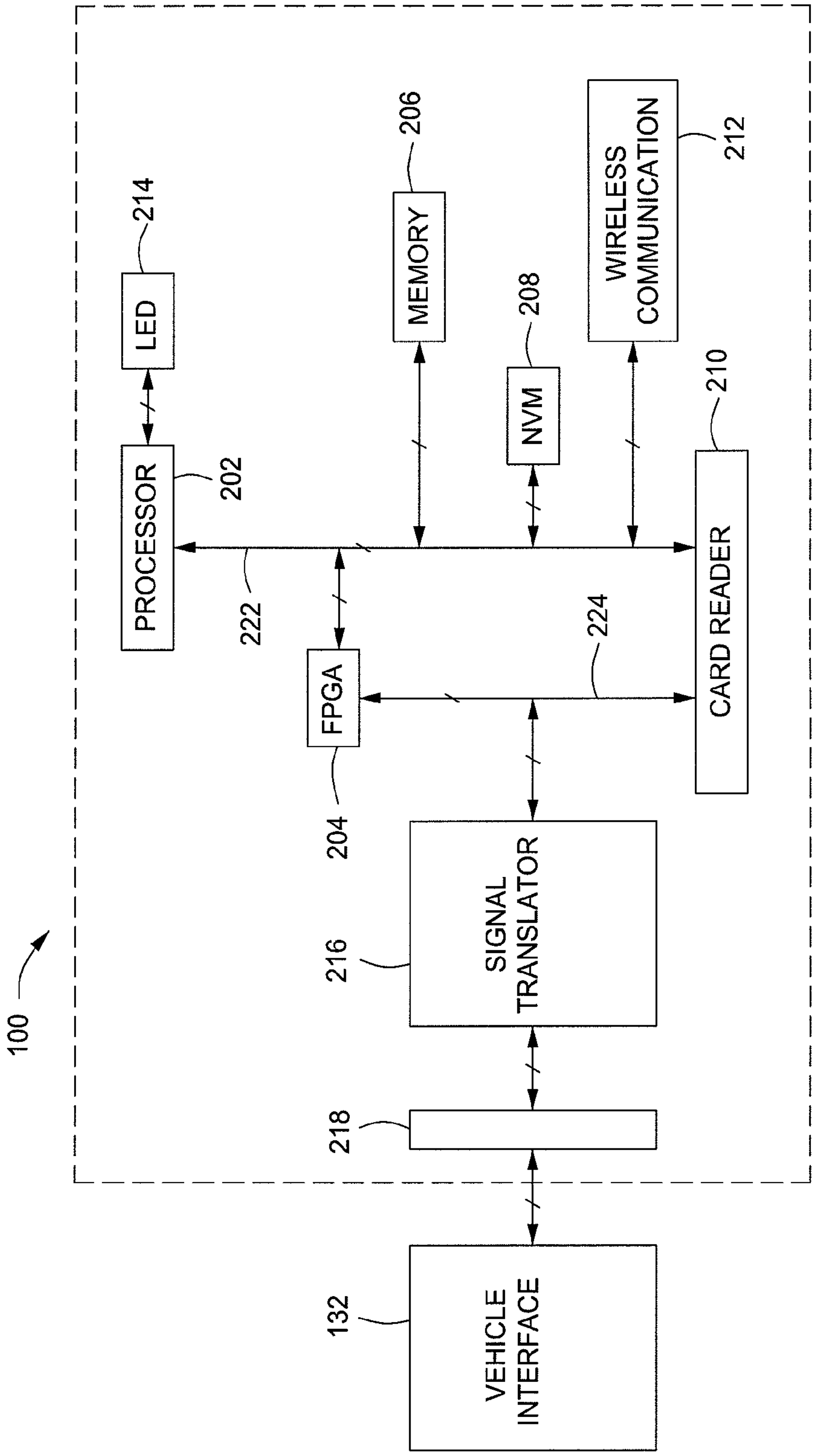
FIG. 4 illustrates a block diagram of the components of the wireless VCI.

FIG. 4 is a block diagram of the components of the wireless VCI 100. In FIG. 4, the wireless VCI 100 according to an embodiment of the invention includes a processor 202, a field programmable gate array (FPGA) 204, a first system bus 224, a memory subsystem 206, an internal non-volatile memory 208, a card reader 210 (optional), a second system bus 222, a connector interface 218, a selectable signal translator 216, a wireless communication circuitry 212 and LEDs 214. A vehicle communication interface 132 is in communication with the wireless VCI 100 through connector interface 218 via an external cable (not shown).

Selectable signal translator 216 communicates with the vehicle communication interface 132 through the connector interface 218. Signal translator 216 conditions signals received from an ECU unit through the vehicle communication interface 132 to a conditioned signal compatible with the wireless VCI 100. Signal translator 216 can communicate with, for example, the following communication protocols: J1850 (VPM and PWM), ISO 9141-2 signal, communication collision detection (CCD) (e.g., Chrysler collision detection), data communication links (DCL), serial communication interface (SCI), S/F codes, a solenoid drive, J1708, RS232, Controller Area Network (CAN), Keyword 2000 (ISO 14230-4), OBD II or other communication protocols that are implemented in a vehicle.

The circuitry to translate and send in a particular communication protocol can be selected by FPGA 204 (e.g., by tri-stating unused transceivers). Signal translator 216 is also coupled to FPGA 204 and the card reader 210 (optional) via the first system bus 224. FPGA 204 transmits to and receives signals (i.e., messages) from the ECU unit through signal translator 216.

The FPGA 204 is coupled to the processor 202 through various address, data and control lines by the second system bus 222. FPGA 204 is also coupled to the card reader 210 through the first system bus 224. The processor 202 is also coupled to the LEDs 214 in order to provide information to the user.

Memory subsystem 206 and internal non-volatile memory 208 are coupled to the second system bus 222, which allows for communication with the processor 202 and FPGA 204. Memory subsystem 206 can include an application dependent amount of dynamic random access memory (DRAM), a hard drive, and/or read only memory (ROM). Software to run the wireless VCI 100 can be stored in the memory subsystem 208, including any database.

Internal non-volatile memory 208 can be an electrically erasable programmable read-only memory (EEPROM), flash ROM, or other similar memory. Internal non-volatile memory 208 can provide, for example, storage for boot code, self-diagnostics, various drivers and space for FPGA images, if desired. If less than all of the modules are implemented in FPGA 204, memory 208 can contain downloadable images so that FPGA 204 can be reconfigured for a different group of communication protocols.

Wireless communication circuit 212 communicates with the processor 202 via second bus system 222. The wireless communication circuit can be configured to communicate to satellites, cellular phones (analog or digital), Bluetooth®, Wi-Fi, Infrared, Local Area Networks or other wireless communication. The wireless communication circuit allows the wireless VCI 100 to communicate with other devices wirelessly including a workstation, as explained above.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A vehicle diagnostic device used in emissions testing, comprising:

a processor that controls the vehicle diagnostic device used in the emissions testing;

a memory that contains a software for use by the processor to conduct the emissions testing;

a communication protocol circuit in communication with the processor and communicates in a communication protocol of a vehicle;

a wireless communication module in communication with the processor and allows the vehicle diagnostic device to communicate wirelessly with a remote computing device;

a plurality of light emitting diodes (LEDs) on a housing to indicate information to a user as to a state of the vehicle diagnostic device; and a programmable function key that is programmable to run a function on the remote computing device.

2. The device of claim 1 further comprising of:

a yes key in communication with the processor and configured to answer affirmatively to a question posed by the remote computing device; and a no key in communication with the processor and configured to answer negatively to a question posed by the remote computing device.

3. The device of claim 2, wherein the yes and no buttons are further configured to scroll through an information screen displayed on a display of the remote computing device when pressed.

4. The device of claim 1, wherein the programmable function key is programmed to start an emission testing software on the remote computing device.

5. The device of claim 4, wherein the programmable function key is programmed to display a menu of the emission testing software on the remote computing device.

6. The device of claim 1, wherein the programmable function key is programmed to record on-board diagnostic II (OBD II) data from the vehicle when pressed a first time and to stop recording when pressed a second time.

7. The device of claim 1, wherein the programmable function key is programmed to clear diagnostic trouble codes (DTCs) stored in the vehicle.

8. The device of claim 4, wherein the programmable function key is programmed to display diagnostic information such as status of readiness monitors in the vehicle on a display of the remote computing device.

9. A method of controlling a remote workstation with a vehicle diagnostic device used in emissions testing, comprising:

receiving a first input from a programmable function button on the vehicle diagnostic device used in the emissions testing to start an emission testing software on the remote workstation;

displaying the emission testing software on a display of the remote workstation;

receiving a second input from the programmable function button to display a menu of functions of the emission testing software on the display of the remote workstation;

receiving a selection of various functions on the menu through the programmable function button; and receiving a third input from the programmable function button to start the emissions testing.

10. The method of claim 9 further comprising:

receiving an affirmative input from a yes key that is configured to answer affirmatively to a question posed by the emission testing software; and receiving a negative input from a no key that is configured to answer negatively to a question posed by the emission testing software.

11. The method of claim 9 further comprising:

receiving a first directional input from a yes key that is configured to scroll information in a first direction; and receiving a second directional input from a no key that is configured to scroll information in a second direction.

12. The method of claim 9 further comprising:

receiving a first recording input from the programmable function button to record on-board diagnostic II (OBD II) data from a vehicle when pressed a first time; and receiving a second recording input from the programmable function button for a second time to stop recording of on-board diagnostic II (OBD II) data from the vehicle.

13. A vehicle diagnostic device used in emissions testing, comprising:

means for processing configured to control the vehicle diagnostic device used in the emissions testing;

means for storing for configured to contain a software for use by the means for processing to conduct the emissions testing;

means for communicating configured to communicate in a communication protocol of a vehicle and is in communication with the means for processing;

means for wireless communication in communication with the means for processing and allows the vehicle diagnostic device to communicate wirelessly with a remote computing device;

means for indicating on a housing to indicate information to a user as to a state of the vehicle diagnostic device; and means for programming function that is programmable to run a function on the remote computing device.

14. The device of claim 13 further comprising of:

means for responding affirmatively that is in communication with the means for processing and configured to answer affirmatively to a question posed by the remote computing device; and means for responding negatively that is in communication with the means for processing and configured to answer negatively to a question posed by the remote computing device.

15. The device of claim 14, wherein means for responding affirmatively and means for responding negatively are further configured to scroll through an information screen displayed on a display of the remote computing device when pressed.

16. The device of claim 13, wherein the means for programming function is programmed to start an emission testing software on the remote computing device.

17. The device of claim 13, wherein the means for programming function is programmed to display an emissions testing menu of the software on the remote computing device.

18. The device of claim 13, wherein the means for programming function is programmed to record on-board diagnostic (OBD II) data from the vehicle when pressed a first time and to stop recording when pressed a second time.

19. The device of claim 13, wherein the means for programming function is programmed to clear diagnostic trouble codes (DTCs) stored in the vehicle.

20. The device of claim 13, wherein the means for programming function is programmed to display diagnostic information such as status of readiness monitors in the vehicle on a display of the remote computing device.

* * * * *